April 22, 1952 C. O. BRUESTLE 2,593,838
REEL CHUCK CRADLE FOR STRANDING MACHINES
Filed Jan. 9, 1951 2 SHEETS—SHEET 1
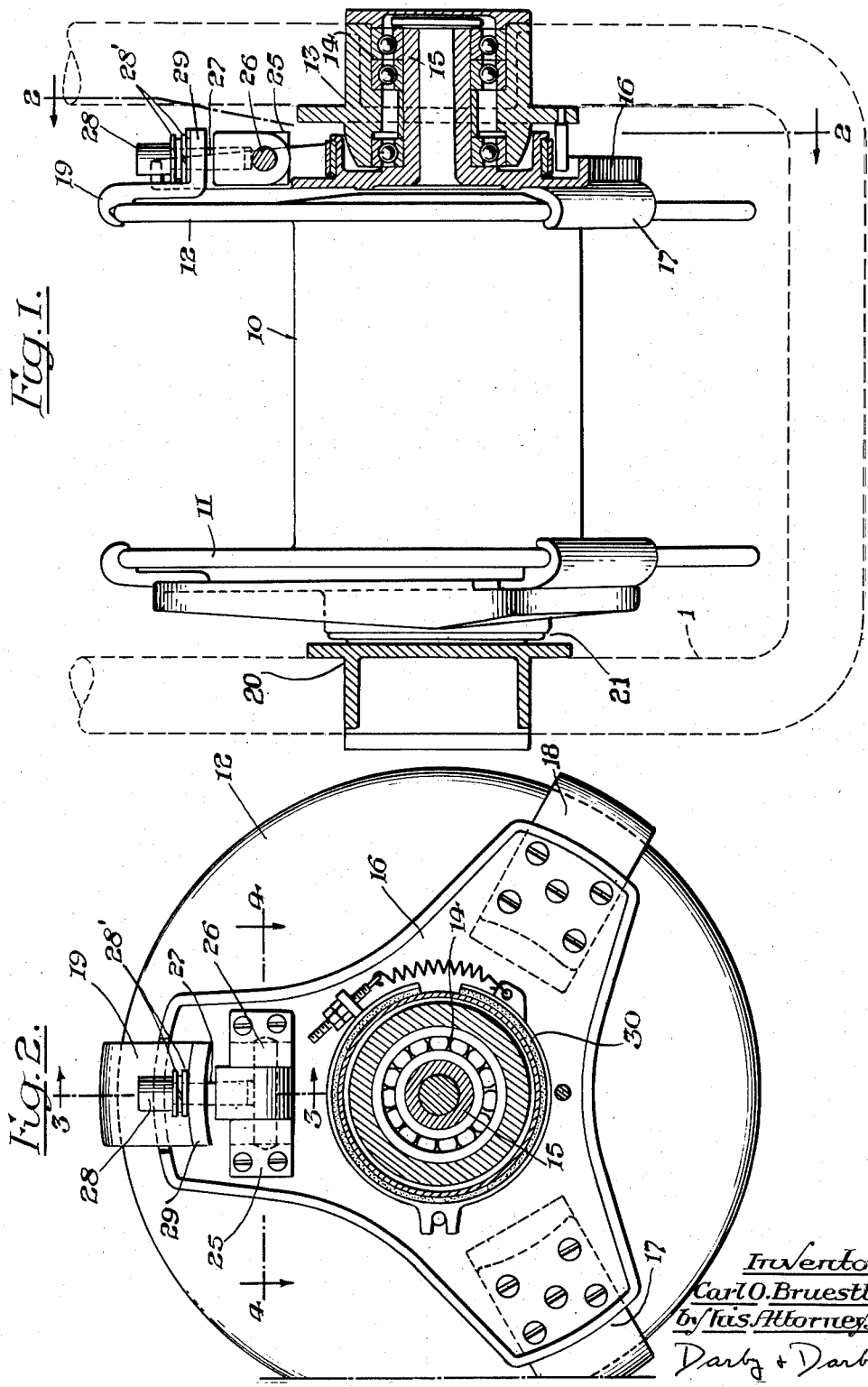
Inventor:
Carl O. Bruestle
by his Attorneys,
Darby & Darby

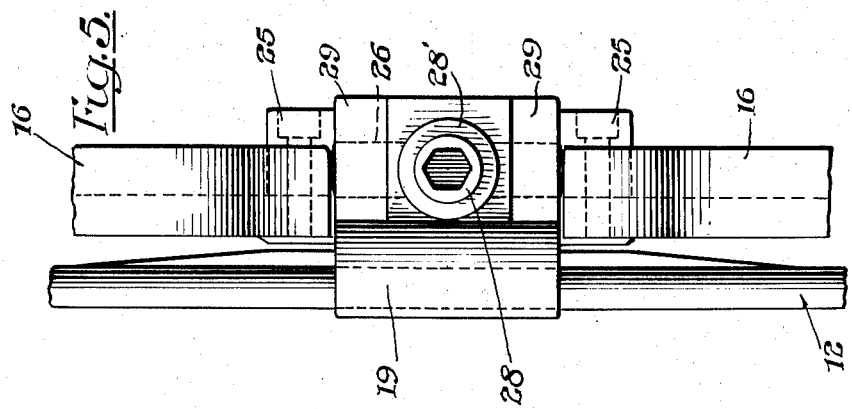
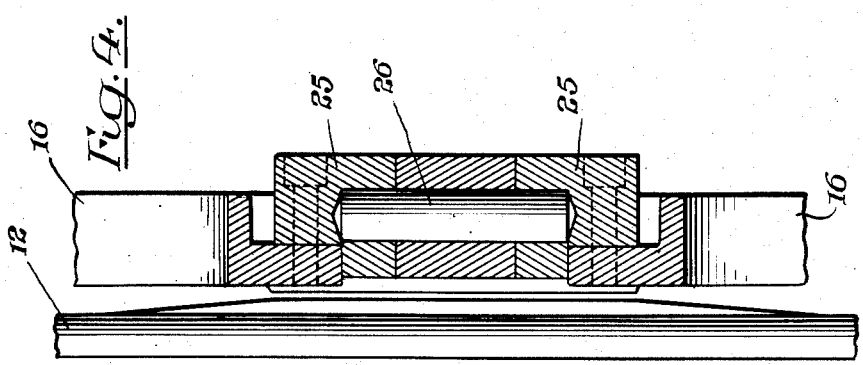
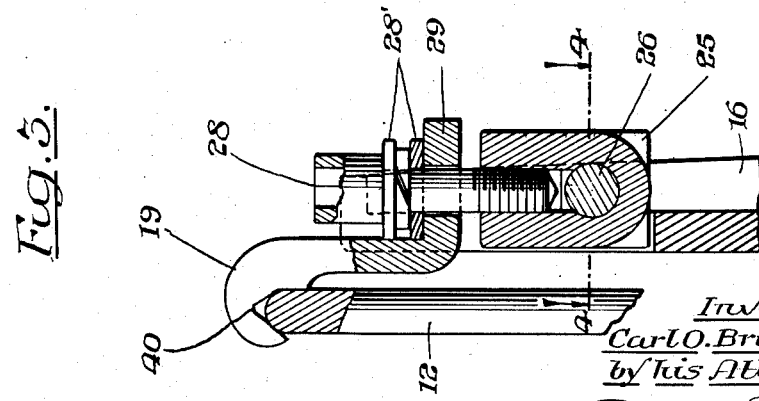

Patented Apr. 22, 1952

2,593,838

UNITED STATES PATENT OFFICE 2,593,838

REEL CHUCK CRADLE FOR STRANDING MACHINES

Carl O. Bruestle, Metuchen, N. J., assignor to Synchro Machine Company, Perth Amboy, N. J., a corporation of New Jersey Application January 9, 1951, Serial No. 205,180

5 Claims. (Cl. 57—59)

1

This invention relates to a cradle for use in strand handling machines or machines for winding operations wherein normally a plurality of spools of wire are carried in individual cradles, the wire being fed axially or longitudinally in a given direction and being twisted into a rope at the end thereof.

A common construction for stranders involves large wheel members adapted to receive the desired number of spools or reels of wire in appropriately placed cradles along the circumference of the supporting wheel. The mounting of the reel necessarily requires that at least a small clearance be available between the hollow axle of the spool and its supporting arbor. When the wheel or spider member is swung around in the stranding process, it is apparent that the reel load shifts in two planes from one side to the other, twice each revolution, thereby aggravating the wear which occurs until the point is reached where the clearance becomes substantial and the shifting of the load becomes so great as to render the cradle inoperative because of excessive vibrations thus built up.

It is accordingly a fundamental object of the instant invention to provide a cradle structure for wire spools which will not be subject to the disadvantage of aggravating wear and accompanying loose fit.

It is the second object of the invention to provide a cradle structure which will hold a wire spool firmly in position and accurately aligned with the machine.

It is another object of the invention to provide a cradle structure wherein the wire spool is held firmly in place at a plurality of points on the circumference of the spool flange itself.

It is another object of the invention to provide a form of chuck for grasping a wire spool and holding it in place.

It is another object of the invention to provide a reel support which will hold a reel securely and thereby permit high operating speeds of the machine.

Other objects and advantages of the invention will in part be obvious and in part appear hereinafter.

The invention accordingly is embodied in a form of cradle for wire spools, the cradle including a chuck in two parts, one for grasping each side of a spool, the two parts thereof being alike in their grasping elements, each part of the cradle comprising a pair of fixed points accurately placed for centering the spool in the cradle and the third point being movable to provide

2 room for insertion of the spool into the cradle, the point being movable to fasten the cradle in place so that in essence there is formed a three-jawed chuck on each side of an axis, each of the three jaws grasping one of the outside flanges of the spool, one of each set of three jaws being movable to allow the admission of the spool.

In the drawings,

Figure 1 constitutes a side elevation partly in section showing the mount for a cradle and the general form of structure embodied in the cradle of the instant invention for holding a wire spool in place;

Figure 2 is an end elevation of said chuck showing the relationship of the several jaws thereof;

Figure 3 is a detailed section through the movable jaw to show the arrangement of parts therein;

Figure 4 is a top elevation partly in section showing the structure for hinging the movable jaw in place; and Figure 5 is a plan view of the movable jaw shown in Figure 3.

In Figure 1 the general structure of the cradle 1 is shown and therein 10 represents a spool having flanges 11 and 12. For clarity in discussing the structure, reference can be had to Figures 1 and 2 for the complete identification of the several parts involved. The axis of the cradle is represented by stationary member 13 mounted in the frame of the machine, which serves as a mount for bearings 14, which carry the axle 15 of the chuck 16, which has the several jaws 17, 18 and 19. The other side of the chuck is similarly mounted in a fixed frame 20, carrying bearings 21.

From Figure 2 it appears that the typical half of the cradle is essentially a three jawed chuck with two fixed jaws 17 and 18 and a single movable jaw 19, the latter being formed by providing the fixed base 25 as a pivot point for axle 26 about which the jaw 19 may be rotated. The jaw is formed as an L and is held in place by a pivot pin 27, which also carries capscrews 28 for fixing the jaw in place at 29. As appears in Figure 1, the jaw 19 is formed with a lip which grasps the flange 12 of the spool and also furnishes the extension 29 at its base through which the pivot 27 passes to be locked in place by the capscrew 28 and lockwasher 28'.

Briefly, when the capscrew 28 is raised, the jaw 19 can be elevated off from the flange of a spool and tilted away therefrom for permitting elevating the spool upward and out of the mechanism.

In Figure 2 the structure of the bearing around the axle and the friction strap 30 around it, which is provided to furnish a certain amount of drag on the spool to control the rate of feeding the wire therefrom, is all substantially conventional.

In Figure 3, details of the movable jaw of the chuck appear. There it is seen that the flange 12 fits into the groove 40 in the jaw 19, the remaining parts of the pivotal structure being the same as those in Figures 1 and 2. The groove 40 has the same radius of curvature as the flange of a spool and is preferably formed with substantially planar sides so that the curved section of flange 12 will find contact with both sides of the groove and thus be accurately centered in the jaws of the chuck. The stationary chuck jaws 18 and 17 are similarly formed.

In Figure 4 which constitutes a section through Figure 3, taken along the line 4—4, the nature of the structure clearly appears. That is, axle 26 serves as the pivot point about which jaw 19 can turn back away from the spool.

In Figure 5, which is a plan view of the structure shown in Figure 3, the form of the jaw is readily seen with its lower flange 29 compressed toward the axle 26 by the nut 28.

From the description of the several elements, it will be apparent how the device operates. When the strander having cradles formed in accordance with the instant invention is being used and it is desired to insert a fresh spool of wire, the cradle is turned to a position such that the pivotal jaw 19 is faced upwardly. In this position capscrew 28 is loosened and the jaw 19 tipped back, thereby permitting the insertion of a sling under a spool of wire held in the jaw and lifting the spool out.

For reloading, the operation is simply the reverse. With fixed jaws oriented appropriately, a full spool is lowered in place and the pivotal jaw replaced and tightened to hold the entire structure.

Though the structure has been described as including only a single pivotal jaw, it is apparent that either of the other two jaws 18 or 17 could be of a similar form thereby providing, rather than two fixed points and one movable point, a plurality of movable points. However, because two fixed points are adequate for most purposes, simplicity calls for making the cradle with two fixed points and one movable jaw.

With reference to Figure 3, the object of forming the jaw with an interior V groove 40 is to provide a small amount of play in the structure for permitting simple centering of the device, that is, alignment of three jaws having curved interior sides matching the radius of curvature of the spools, flanges and edges would be a relatively difficult task. When the curved sides of the jaw are made in the form of a simple V, centering of the spool occurs substantially automatically and minor inaccuracies in alignment are thus easily absorbed.

Though the invention has been described with only a single embodiment as applied to stranding machines, it should be apparent to those skilled in the art that variation thereof may be carried out without departing from its scope and that the invention is to be limited only as defined in the appended claims. Thus, it may be adopted for use in machines for winding and unwinding operations wherein a reel carrying strands of wire or rope must be conveniently supported.

What is claimed is:

1. In a strand handling machine comprising a structure for carrying a plurality of wire spools, a cradle for a spool comprising bearings defining an axis for said cradle and a plurality of jaws placed about the axis of said cradle, said jaws including at least one movable jaw on either side of the cradle adapted to receive a wire spool and grip the spool for a stranding operation.

2. A structure in accordance with claim 1, the cradle comprising essentially a three-jawed chuck for grasping one side of a wire spool, one of said jaws being adjustable and pivotally mounted for movement into and out of engagement with a wire spool.

3. In a structure in accordance with claim 2, the pivotally mounted chuck jaw being formed with a V groove therein for receiving the flange of the spool.

4. The structure in accordance with claim 3, the jaws being placed symmetrically about the axis of the cradle.

5. In a strand handling machine comprising a structure for carrying a plurality of spools of stranded material, a cradle for a spool comprising bearings defining an axis for said cradle and a plurality of jaws placed about the axis of said cradle, said jaws including at least one movable jaw on either side of the cradle adapted to receive one of said spools and grip the spool for a stranding operation.

CARL O. BRUESTLE.

REFERENCES CITED

The following references are of record in the file of this patent:

UNITED STATES PATENTS

| Number | Name | Date |
|---|---|---|
| 2,177,812 | Robbins et al. | Oct. 31, 1939 |
| 2,277,102 | Henning et al. | Mar. 24, 1942 |
| 2,452,255 | McKosky | Oct. 26, 1948 |